United States Patent Office 3,247,166
Patented Apr. 19, 1966

3,247,166
PICOLYLAMIDES OF ALKENE-1,2 CARBOXYLIC ACIDS AND POLYMERS AND COPOLYMERS THEREOF
Gaetano F. D'Alelio, South Bend, Ind., assignor, by direct and mesne assignments, to Dal Mon Research Co., Cleveland, Ohio, a corporation of Delaware
No Drawing. Filed Sept. 11, 1961, Ser. No. 137,064
20 Claims. (Cl. 260—78)

This invention relates to new monomers and to new polymeric materials derived therefrom, more particularly it is directed to the polymerization products obtained by polymerizing a mass comprising a picolylamide of an alkene-1,2 carboxylic acid in the presence or absence of other ethylenic copolymerizable compounds, especially acrylonitrile. The invention also relates to compositions of these polymerization products adapted to the formation of shaped articles, in many cases to molecularly oriented shaped articles, particularly to fibers, threads, bristles, mono-filaments, etc., hereinafter referred to as fibers, and other shaped articles such as films and the like, which articles show improved dyeing properties.

Acrylonitrile polymers have been particularly difficult to dye. Since acrylonitrile polymers, particularly those containing at least 85% acrylonitrile therein, are used extensively in the production of fibers for textile and other purposes, and also in thin films, it is particularly essential that these polymers be made receptive to various types of dyes.

Numerous proposals have been made for improving the dye receptivity of these polymers. While some of these proposals have certain advantages, the particular means for effecting these results also have disadvantages or produce undesirable side effects which have prevented these proposals from meeting with any considerable commercial acceptance. The very fact that new methods are still being sought to improve the dye receptivity of these polymers is evidence of the fact that there has been no universal solution to this difficulty and that considerable problems still exist.

It has now been found that the new compounds of this invention are particularly useful and suitable for improving the dye receptivity of arcylonitrile polymers. In addition to yielding dye-receptive copolymers with acrylonitrile, the new compounds of this invention can also be used effectively to form useful homopolymers and copolymers with various other types of copolymerizable ethylenic compounds having a $CH_2=C<$ group.

The compounds of this invention have a formula selected from the group consisting of

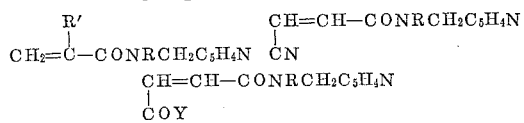

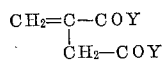

and

wherein R' is H, Me, Cl or CN, Y is

—NRCH$_2$C$_5$H$_4$N, —OR, —NR$_2$, piperidinyl, piperazinyl or morpholine group; R is hydrogen or a hydrocarbon radical, such as alkyl, aryl, or cycloalkyl groups or combinations thereof, and the halogen, alkoxy, aryloxy or cycloalkoxy derivatives thereof, the R groups, including those with alkoxy, aryloxy and cycloalkoxy groups therein, preferably having no more than about 20 carbon atoms therein; and in the above formula having two Y groups, at least one of said groups represents —NRCH$_2$C$_5$H$_4$N.

The —NRCH$_2$C$_5$H$_4$N represents the amine group derived from picolylamine. The methylamino group can be substituted on any of the carbon atoms in the pyridine range. These picolylamine isomers have the following formulas:

1-picolylamine:

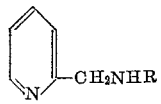

2-picolylamine:

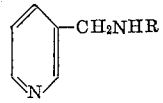

3-picolylamine:

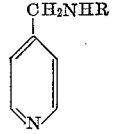

Because of availability and economic factors, the 3-picolylamine is preferred in the practice of this invention. However, the other isomers can be prepared according to the methods shown by Richter's Organic Chemistry, vol. III, p. 169, P. Blakiston's Sons and Co., 1923, Philadelphia, by the Hofmann Reaction on the corresponding amide or by the reaction of ammonia or primary amines on the corresponding pyridyl carbinol halides, or by the methods described in U.S. Patents 2,798,075 and 2,798,077, and in British Patents 775,831 and 782,067.

Typical examples of radicals represented by R in the above formulas are methyl, ethyl, propyl, amyl, hexyl, decyl, chloromethyl, chloroethyl, cyclohexyl, methyl-cyclopentyl, propyl-cyclopentyl, amyl-cyclopentyl, methyl-cyclohexyl, dimethyl-cyclohexyl, chlorocyclohexyl, phenyl, chlorophenyl, xenyl, naphthyl, tolyl, diphenyl, chlorotolyl, xyiyl, ethylphenyl, propylphenyl, isopropyl-phenyl, benzyl, chlorobenzyl, phenethyl, phenyl-propyl, phenyl-butyl, acetoxy-ethyl, chlorophenoxy-ethyl, acetoxy-propyl, propionoxy isopropyl, benzoxy-phenyl, acetoxy-benzyl, butyroxy-tolyl, acetoxy-cyclohexyl, methoxy-propyl, ethoxy-propyl, phenoxy-phenyl, ethoxy-benzyl, propoxy-tolyl, methoxy-cyclohexyl, etc.

In accordance with the present invention it has now been found that improvements in dyeing properties of acrylonitrile polymers are obtained by the polymerization of polymerizable masses comprising acrylonitrile and these picolylamide of an alkene-1,2 carboxylic acid with or without other copolymerizable ethylenic compounds. It has been found further that in addition to the fact that these particular picolylamides yield particularly valuable copolymers with acrylonitrile, they may also be used effectively to form copolymers with other types of copolymerizable ethylenic compounds having a $$CH_2=C<$$

group. Thus it has been found that valuable polymerization products can be prepared in accordance with the invention by polymerizing a mass comprising a picolylamide of an alkene-1,2 carboxylic acid in the presence of other ethylenic polymerizable compounds such as acrylonitrile and the other polymerizable ethylenic compounds listed hereinafter. It has been found further that the picolylamides of those alkene-1,2 carboxylic acids which normally form homopolymers, likewise form homopolymers with useful properties, and that they can be utilized as such or blended or mixed with other polymers or copolymers to achieve specific end-results or end-use products. Thus, it has been found that valuable polymerization products can be prepared in accordance with this invention by polymerizing a mass comprising a picolylamide of an alkene-1,2 carboxylic acid either in the presence or absence of other ethylenic compounds such as acrylonitrile or other copolymerizable ethylenic compounds as listed hereinafter.

The new monomers of this invention are polymerizable or copolymerizable amides of ethylenic carboxylic acids and can be prepared by amidating acrylic acid, alpha-methacrylic acid, alpha-chloroacrylic acid, alpha-cyanoacrylic acid, beta-cyanoacrylic acid, maleic acid, fumaric acid, maleic acid monoesters, maleic acid mono-amides, fumaric acid monoesters, fumaric acid mono-amides, itaconic acid, itaconic acid monoesters, itaconic acid mono-amides, etc., and the corresponding anhydrides with a picolylamine of the formula

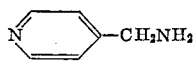

The picolylamine may be 1-picolylamine,

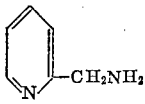

2-picolylamine,

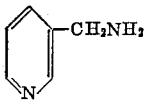

or 3-picolylamine

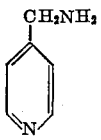

but because of availability and economic factors, the 3-picolylamine is preferred, in the practice of this invention. The alkene-1,2 carboxylic amides of picolylamine used in the practice of this invention have the basic structure $$\underset{|}{CH}=\underset{|}{C}-COOZ$$

where Z is the residue obtained by removing the replaceable active hydrogen from the amine group in the picolylamine leaving the structure

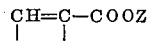

The acrylic, methacrylic, chloroacrylic, cyanoacrylic, maleic, fumaric, itaconic etc. amides hereinabove all possess the basic structure, $$\underset{|}{CH}=\underset{|}{C}-COOZ$$

for example,

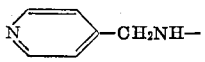

The acrylic amides of this invention can be represented by the formulas

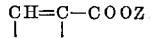
and
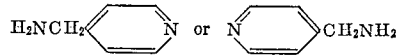

wherein R′ is a hydrogen, a methyl, a chlorine, or a cyano-group and Z is a picolylamide group or —NRCH$_2$C$_5$H$_4$N where R is hydrogen or a hydrocarbon group.

The maleic and fumaric acid amides of this invention can be represented by the formula $$\underset{\underset{COY}{|}}{CH}=CH-COZ$$

wherein Z and Y are as above indicated.

The itaconic amides of this invention are represented as $$\underset{\underset{CH_2COY}{|}}{CH_2}=C-COY$$

with Y as indicated above and at least one of which represents a —NRCH$_2$C$_5$H$_4$N group.

The picolylamides of this invention can be readily prepared by reacting the picolyl amine with the corresponding acid, anhydride, or chloride according to standard amidation procedures, e.g.,

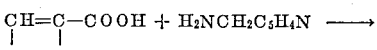
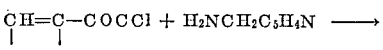
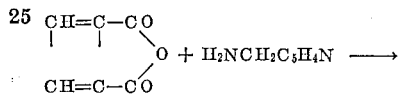
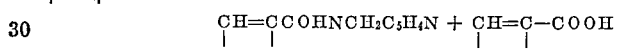

In the case where HCl is liberated, the hydrochloride salt of the ester is formed and it may be used as such or liberated during or after formation by neutralizing the HCl with an acid acceptor, such as tributyl amine, etc.

When the alkene-1,2 carboxylic acid is a dicarboxylic acid such as maleic or itaconic acid, the anhydrides can be used and the reaction is represented as follows:

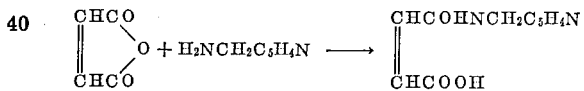
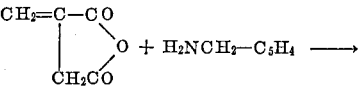

$$CH_2=C-CH_2COHNCH_2C_5H_4N$$
$$\underset{|}{COOH}$$

Also, when dicarboxylic acids or the anhydrides are used, one of the carboxylic groups can be esterified before amidation with the picolylamine. Or, similarly, another type amide group can be introduced before amidation with the picolylamine. Likewise, when the dibasic acids or anhydrides are used, amidation can be carried either to the monoester or diester stages. If carried to the monostage only, the remaining carboxylic group can be esterified or amidated as desired.

An alternate synthesis for the preparation of the monomers of this invention is to amide exchange a lower amide of an ethylene carboxylic ester with a picolyl amine, e.g.,

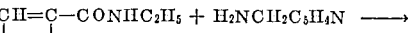
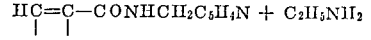

in the presence of an amide exchange catalyst such as sulfuric acid, zinc chloride, etc. In these and other ways known to those skilled in the art, amides of ethylenic carboxylic acids and pioclylamine can be readily formed. the polymers and copolymers of this invention contain the repeating unit derived from the basic structure, that is

The amides of this invention are not to be confused with the amides of beta-aminoethyl pyridine, $$H_2NCH_2CH_2C_5H_4N$$

such as the acrylic amide of the formula $$CH_2=CHCONHCH_2CH_2C_5H_4N$$

While the beta-aminoethyl derivatives are satisfactory initially for improving the dyeability of polyacrylonitrile and other polymers, they are unstable both in the monomeric and polymeric form, readily deacylating at 150° C. at atmospheric pressure to produce acrylamide and vinyl pyridine. Since this vinyl pyridine is lost thereby making the pyridine nucleus is unavailable for its proper function, such as in ion-exchange, dyeing, acid neutralization, etc.; thus $$CH_2=CHCOOCH_2CH_2C_5H_4N \longrightarrow$$
$$CH_2=CHCONH_2 + CH_2=CHC_5H_4N$$

and $$(-CH_2CH-)_n \longrightarrow$$
$$\overset{|}{CONRC_2H_5C_5H_4N}$$
$$(-CH_2CH-)_n + nCH_2=CHC_5H_4N$$
$$\overset{|}{COOH}$$

In contrast, since the picolylamides of this invention do not contain a beta carbon atom in their amide structures, they do not undergo this deamidation.

For reasons of economy and availability, the acrylic and itaconic type amides are preferred in the practice of this invention, especially over the alpha-chloro-, alpha-cyano- and beta-cyano-acrylic acid amides. For ease of copolymerization with most monomers the acrylic and itaconic amides are preferred somewhat over the maleic and fumaric amides, although with some comonomers, such as with vinyl acetate, styrene, and alpha-methyl-styrene, the maleic amides are very satisfactory and may be preferred. The preference, therefore, depends on the particular copolymer system selected, and the end-use for which the copolymer product is desired. For example, the itaconic amides contain an allylic type structure which is particularly advantageous in controlling the molecular weight of the desired polymer, and in solution polymerization these are somewhat more effective than the acrylic amides. Also, the polymerizable monoamides of picolylamine of this invention, when polymerized alone or in comonomer compositions, are effective in producing dyeable compositions especially responsive to acid dyes. The amides are more receptive to acid dyes than the monoamides. However, the monoamides offer a secondary advantage in that the second carboxyl group can be left converted to serve as a dye site for basic dyes, allowing the copolymer to be dyed with either acid or basic dyes. Or the monoamide can be converted to a normal ester group which can then serve as a solvent-type dye site for acetate- and polyester-type dyes. Or it can be converted to an amide group which can function as a dye-site for acid dyes, basic dyes, or solvent-type dyes. Thus, it is seen that the picolylamides of this invention are versatile and useful monomers from which a wide variety of useful polymers can be prepared.

The monomers of this invention can be prepared as illustrated in the following illustrative examples wherein parts and percentages are by weight unless otherwise specified.

*Example I*

21.6 parts of 3-picolylamine are mixed with 200 parts of diethyl ether, and there is added slowly and with stirring 25.2 parts of acrylic anhydride dissolved in 100 parts of diethyl ether. The mixture is refluxed for approximately 1 hour, then cooled, and the solution neutralized slowly with a 10% NaOH aqueous solution. The ether layer is decanted, washed with 100 parts water, dried over anhydrous sulfate, filtered and the filtrate evaporated to dryness, and there is obtained a residue M.P. 45–83° C. The residue is distilled under reduced pressure, using a water aspirator (15–35 mm.) and the water-white picolyl acrylamide isolated within boiling point range of 150–180° C. Ultimate analysis for carbon, hydrogen and nitrogen and molecular weight determinations on the product give results that are in close agreement with the theoretical values for $CH_2=CHCONHCH_2C_5H_4N$.

Substitution of equivalent quantities of alpha-chloroacrylic anhydride, alpha-cyanoacrylic anhydride, beta-cyanoacrylic anhydride, and methacrylic anhydride for acrylic anhydride in the foregoing procedure yields the various picolylamides of this invention which are characterized by ultimate analyses and molecular weight determinations as in the foregoing procedure. Likewise substitution of the 2-picolylamine and 1-picolylamine respectively for the 3-picolylamine yields the corresponding derivatives.

*Example II*

The monomers of Example I are also prepared by using the acid chlorides instead of the anhydride. This procedure, as illustrated by the use of acrylyl chloride, is also applicable to methacrylyl chloride, the alpha and beta cyanoacrylyl chlorides, and alpha-chloroacrylyl chloride. 21.6 parts of 3-picolylamine is added to 200 parts of diethyl ether and there is added slowly and with stirring 18.0 parts of acrylyl chloride dissolved in 150 parts of diethyl ether. The mixture is refluxed for approximately ½ hour, is cooled and evaporated. The residue is dissolved in water and shaken with 29 parts of silver oxide to remove the chloride ion and the mixture extracted with five 100 part portions of diethyl ether and filtered, drying, evaporation and product isolated as in Example I.

Instead of silver oxide, sodium or potassium hydroxide can be used to neutralize the hydrogen chloride formed in the esterification.

*Example III*

21.6 parts of 2-picolylamine is admixed with approximately 150 parts diethyl ether and there is added slowly and with stirring 19.6 parts maleic anhydride. The mixture is refluxed for approximately ½ hour, cooled and the ether evaporated. The residue is recrystallized from absolute ethanol. There is obtained the picolylamine half-amide of maleic acid. Ultimate analyses for carbon, hydrogen and nitrogen and molecular weight determinations on the product give results which are in close agreement with the theoretical values for $$CH=CH-CONHCH_2C_5H_4N$$
$$\overset{|}{COOH}$$

Substitution of equivalent amounts of 1-picolylamine, 2-picolylamine, methyl-3-picolylamine, butyl-3-picolylamine, phenyl-2-picolylamine, cyclo-2-picolylamine, and cyclohexyl-1-picolylamine respectively for the 3-picolylamine in the above procedure produces the corresponding amide. Substitution of itaconic anhydride for maleic anhydride in the above procedure with the 3-picolylamine produces the corresponding half amides of itaconic acid of this invention, which has a melting point of 166–168° C. These are also characterized by ultimate analyses and molecular weight determinations, as in the foregoing procedures. The itaconic derivative of the 3-picolylamine is represented by the formula $$\left[ \begin{array}{l} CH_2=C-C(O)- \\ CH_2-C(O)- \end{array} \begin{array}{l} -OH \\ -NRCH_2C_5H_4N \end{array} \right]$$

*Example IV*

41.2 parts of the picolylamine half amide of maleic acid (prepared as in Example III) is dissolved in a minimum amount of water and 8.0 parts sodium hydroxide added slowly to form the sodium salt. The water is evaporated and the residue is admixed with approximately 150 parts diethyl ether. There is added slowly and with stirring 25.0 parts dimethyl sulfate. The ether solution is treated with active charcoal washed with water to remove the acid methyl sulfate by-product, dried over anhydrous sulfate, evaporated to dryness at reduced pressure and there is obtained the methyl ester of the structure $$CH_3-OOCCH=CHCONHCH_2C_5H_4N$$

Ultimate analyses for carbon, hydrogen and nitrogen and molecular weight determinations on the product give results which are in close agreement with the theoretical values for the methyl ester.

Substitution of the itaconic half-amide for the maleic half-amide in the foregoing procedure yields the corresponding itaconic methyl ester derivative; while the use of diethyl sulfate produces the ethyl esters which are characterized by ultimate analyses and molecular weight determinations as in the foregoing procedure.

*Example V*

41.2 parts of the picolylamine half-amide of maleic acid is admixed with approximately 150 parts diethyl ether and 29.7 parts thionyl chloride and the mixture refluxed for approximately ½ hour. The ether is evaporated and there is obtained the acid chloride.

This acid chloride is added slowly and with stirring to a mixture of 10.0 parts dimethyl amine and 150 parts diethyl ether in a flask equipped with a reflux condenser. After the addition of the acid chloride the mixture is refluxed for approximately ½ hour and the ether is then evaporated. The residue is dissolved in water and shaken with 29.0 parts silver oxide to remove the chloride ion. The mixture is filtered and the filtrate evaporated to dryness. The residue is recrystallized from absolute ethanol, and there is obtained the N-dimethylamide of maleic half-amide of the picolylamine. Ultimate analyses for carbon, hydrogen, and nitrogen and molecular weight determinations on the product given results which are in close agreement with the theoretical values for $$(CH_3)_2NOCCH=CHCONHCH_2C_5H_4N$$

Substitution of the half-amide of itaconic acid of Example IV in the foregoing procedure for the maleic half-amide produces the corresponding amide,

and substitution of various amines such as methyl amine, diethyl amine, morpholine, etc., in the foregoing procedure produces the amide corresponding to the amine, all of which are characterized by ultimate analyses and molecular weight determinations as in the foregoing procedure.

*Example VI*

The diamide of the picolylamine is prepared using the acid chloride of Example V with the procedure of Example II by reacting the ratio of one mole of the acid chloride to one additional mole of picolylamine, and there is isolated the amide of maleic and itaconic acids respectively.

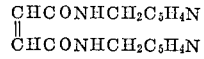

and

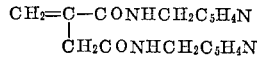

*Example VII*

Equivalent amounts of the butyl half esters of maleic and itaconic esters are converted to acid chlorides by the procedure of Example V and converted to the picolylamides by the procedure of Example II and there is obtained the corresponding maleic and itaconic amides respectively.

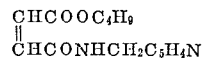

and

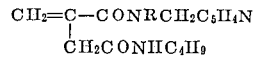

The new monomers of this and the preceding example are characterized by ultimate analyses and molecular weight determinations as in the foregoing procedures.

*Example VIII*

The procedure of Example VII is repeated using maleamic acid, $H_2NOCCH=CHCOOH$, N-methyl maleamic acid, $H_3CNHOCCH=CHCOOH$, N-phenyl maleamic acid, $C_6H_5NHOCCH=CHCOOH$, N,N-dimethyl maleamic acid, $(CH_3)_2NOCCH=CHCOOH$, and the corresponding picolylamides, $$R_2NOCCH=CHCONHCH_2C_5H_4N$$

are obtained which are characterized as in the foregoing procedures.

*Example IX*

Example VIII is repeated using the itaconic half amides instead of the maleic half amides and there is obtained their picolylamides,

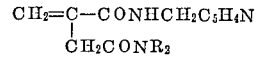

which are characterized as in the foregoing procedures.

*Example X*

Five polymers of acrylonitrile are prepared from the following monomer compositions

| Polymer | Acrylonitrile Parts | $CH_2=CHCONHCH_2C_5H_4N$ Parts |
|---|---|---|
| A | 100 | |
| B | 99.9 | 0.1 |
| C | 95 | 5.0 |
| D | 90 | 10.0 |
| E | 80 | 20.0 |

To 900 parts of water, adjusted to a pH of about three, in a suitable reactor, is added 1.0 part of ammonium persulfate, 0.5 part of sodium bisulfite, and 100 parts of monomer or monomer mixture. The reactor is then flushed with deoxygenated nitrogen and heated with agitation to 50° C., for 18 hours. Steam is introduced into the reactor to remove unpolymerized monomers from the mixture. A small amount of aluminum sulfate is added to the mixture and the polymer isolated by filtration.

The polymer is then washed with water and with methyl alcohol. A portion of the polymer is dissolved in dimethyl formamide, ethylene carbonate, or butyrolactone and a film cast from the solution. The film is washed entirely free of solvent and stretched at a ratio of about 8:1 in a glycerine bath containing for each part of film 0.05 part of 1,5-diamino-4,8-dihydroxyanthraquinone-3-sulfonic acid, 0.03 part sulfuric acid and 50 parts water (50:1 bath-film ratio) at boiling temperature for one hour. The film is then removed and washed with water and scoured for 15 minutes in a 0.4 percent soap solution at 85° C. Whereas the unmodified polyacrylonitrile treated in this manner has little or no color, all of the copolymers are dyed to a much deeper blue shade.

Fibers are spun from the same solutions either by dry spinning or by wet spinning. The fibers are substantially freed from solvent and dried. After cold-drawing the dried fibers 600–900 percent at 120–145° C. and subsequently heat-treating them at 150° C. for one hour, the fibers are given the same dyeing and washing treatment described above with the same results as for the films, a light tint being acquired by the unmodified polyacrylonitrile fibers and a deep and dense color being given to the copolymer fibers. The polymers of this example are also soluble in dimethyl formamide, dimethyl acetamide, dimethylsulfoxide, butyrolactone, formyl morpholine, etc.

*Example XI*

Five parts of the copolymer fiber C of Example X was dyed to a green shade using the vat color, dimethoxy-dibenzanthrone, at 70° c. in a bath containing 0.5 part of dye, 0.2 part sodium hydroxide, 0.5 part sodium hydrosulfite and 100 parts of water (20:1 bath-fiber ratio). After the first 15 minutes of heating, 0.25 part of Glauber's salt was added. The fiber sample is then oxidized in a 0.5 percent sodium dichromate 1.0 percent acetic acid aqueous solution at 70° C. for 30 minutes in a 20:1 bath-fiber ratio. The dyed fiber is then scoured in a 0.5 percent boiling soap solution. A sample of yarn prepared from the unmodified acrylonitrile polymers and dyed under the same conditions acquires only a light shade of color.

When 1,5 - di - p-anisoylamino-4,8-dihydroxyanthra-quinone is used as the vat dye, the fiber is dyed a strong violet color.

The procedure of this example and of Example X can be used with the various other acrylic type amides of a picolylamine such as the methacrylic amides, the alpha-chloroacrylic amides and the alpha- and beta-cyano-acrylic amides instead of the parent acrylic amide.

*Example XII*

The procedure of Example X is repeated at 30° C. for the polymerization of the following monomer compositions:

| Polymer | Acrylonitrile parts | Vinyl-chloride parts | $\begin{array}{c}CH_3\\|\\CH_2=CCONHCH_2C_5H_4N\end{array}$ | Copolymer soluble in— |
|---|---|---|---|---|
| A | 92 | 5 | 3 | DMF, DMA, etc. |
| B | 87 | 10 | 3 | DMF, DMA, etc. |
| C | 82 | 15 | 3 | DMF, DMA, etc. |
| D | 77 | 20 | 3 | NO₃Me |
| E | 57 | 40 | 3 | NO₃Me |
| F | 37 | 60 | 3 | Acetone. |

Sometimes copolymers D, E and F, when dissolved in nitromethane may have gelled, partially dissolved particles known as fisheyes. In such cases, the solubility can be improved by the addition of small amounts of materials which are good solvents for acrylonitrile polymers, such as butyroacetone, ethylene carbonate, dimethyl formamide, dimethyl acetamide, dimethylsulfoxide, etc. In addition, certain materials which are relatively poor solvents for polyacrylonitrile, such as diethyl formamide, diethyl acetamide, diethyl propionamide, etc., can be added to improve the solubility. Also, when acetone solutions of copolymer F contain gelled particles, clarification of the solution can be effected by the addition of nitromethane, diethyl formamide, diethyl acetamide, etc.

Dyeing tests of these copolymers show improvements in dyeing susceptibility similar to those of Example X.

Instead of the methacrylic amide, the other acrylic amides such as acrylic, alpha-chloroacrylic, and the alpha- and beta-cyanoacrylic amides can be used as described above with similar results.

*Example XIII*

The procedure of Example X is repeated at 70° C. for the polymerization of the following monomer composition:

| Polymer | Acrylonitrile parts | Styrene parts | NCCH=CHCONHCH₂C₅H₄N |
|---|---|---|---|
| A | 88 | 7 | 5.0 |
| B | 78 | 17 | 5.0 |
| C | 68 | 27 | 5.0 |
| D | 58 | 37 | 5.0 |

Dyeing tests of these copolymers show improvements in dye susceptibility similar to Example X. In place of styrene, various styrene derivatives can be used, such as alpha-methyl-styrene; nuclear-substituted chloro-styrenes, i.e., ortho-, meta-, and para-chloro-styrenes, dichloro-styrenes, for example, the 2,3-, 2,4-, 2,5-, 2,6-, 3,4- and 3,5-di-chlorostyrenes, trichloro-styrenes; cyano-styrenes, such as ortho-, meta-, and para-cyano-styrenes, dicyano-styrenes, nuclear-substituted alkyl-styrenes, such as mono- and di-methyl-styrenes, mono- and di-ethyl-styrenes, mono- and di-isopropyl-styrenes; aryl-substituted styrenes, i.e., para-phenyl-styrene, etc., cycloaliphatic-substituted styrenes, such as para-cyclohexyl-styrene; fluoro-styrenes, such as ortho-, meta-, para-fluoro-styrene, difluoro-styrenes, etc.; trifluoro-methyl-styrenes, such as ortho-, meta- and mara-trifluoromethyl-styrenes, di - (trifluoromethyl) - styrenes, and various other styrenes or mixtures of any number of these with each other or with styrene.

Instead of the cyano acrylic amide of this example the other amides such as acrylic, methacrylic, alpha-chloroacrylic and alpha-cyanoacrylic can be used with comparable results.

*Example XIV*

The procedure of Example X is repeated for the polymerization of the following monomer compositions:

| Polymer | Acrylonitrile parts | Vinylidene chloride parts | H₃COOCCH=CHCONHCH₂C₅H₄N | Copolymer soluble in— |
|---|---|---|---|---|
| A | 85 | 5 | 10 | DMF, DMA, etc. |
| B | 65 | 25 | 10 | DMF, DMA, etc. |
| C | 45 | 45 | 10 | DMF, DMA, etc. |
| D | 25 | 65 | 10 | DMF, DMA, etc. |
| E | 5 | 85 | 10 | DMF, DMA, etc. |

With the above vinylidene chloride copolymers and similar copolymers having a total of acrylonitrile and vinylidene chloride of at least 85 percent in the polymer molecules, only the more active solvents, such as butyrolactone ethylene carbonate, N,N-dimethyl acetamide, N,N-dimethyl formamide, etc., can be used as solvents. The above copolymers dye more readily and thoroughly than similar compositions containing no picolylamide.

Example XV

The procedure of Example X is repeated for the polymerization of the following monomer compositions:

| Polymer | Acrylonitrile parts | Vinylidene chloride parts | Vinyl chloride parts | $CH_2=CCOOCH_3$ <br> $\|$ <br> $CH_2CONHCH_2C_5H_4N$ |
|---|---|---|---|---|
| A | 80 | 10 | 8 | 2 |
| B | 70 | 20 | 8 | 2 |
| C | 70 | 15 | 13 | 2 |
| D | 50 | 20 | 28 | 2 |
| E | 20 | 18 | 60 | 2 |

The dyeing tests of the copolymers products show dye-susceptibility similar to the copolymers of Example XI.

Instead of copolymerizing the amides of this invention with acrylonitrile, the amide can first be copolymerized with part of the acrylonitrile or with another monomer and this independently prepared copolymer used to modify polyacrylonitrile or acrylonitrile copolymers. These modifying-copolymers can be prepared substantially in accordance with the procedure of Example X and thereafter placed in solution and added to a solution of polyacrylonitrile, so that a composition consisting of sufficient polymeric amide results and satisfactory dyeing is obtained. As examples, polymers D and E of Example X may be used as modifiers for the unmodified homopolymers and copolymers of acrylonitrile. For example, polymer E of Example X, which consists of 80 parts of acrylonitle and 20 parts of the amide has excellent compatibility with homopolymers of acrylonitrile. The overall amounts of amide required to improve the dyeability generally corresponds to the amounts indicated above for copolymers in which the main body of the acrylonitrile polymers contain the amide copolymerized directly therein, that is, at least about 0.1 percent and up to 5 percent or even 10 percent or higher of amide in the ultimate polymer mixture. The following example is illustrative.

Example XVI

A 10 percent solution of polymer E of Example X which consists of 80 parts of acrylonitrile and 20 parts of $CH_2=CHCONHCH_2C_5H_4N$, is prepared in dimethyl formamide and added to dimethyl formamide solution of polyacrylonitrile, containing 20 percent polymer, so that a composition consisting of 90 parts of polyacrylonitrile and 10 parts of the ester copolymer is obtained so as to give an ultimate polymer composition of 98 parts acrylonitrile and 2 parts of the amide. The solution is heated to 130° C., after which the solution is filtered. Films and fibers prepared from this mixture are dyed in accordance with the process of Example XI, and satisfactorily dyed, shaped articles are obtained. The unmodifier polyacrylonitrile without the addition of this acrylamide copolymer shows little or no dye retention.

In many cases, it is desirable to use amide-acrylonitrile copolymers which have even higher ratio of the ester as, for example, 50 to 70 parts of the amide copolymerized with acrylonitrile or methacrylonitrile and even these copolymers of higher amide proportions have good compatibility with acrylonitrile polymers. In other cases, the copolymers of the picolylamide of an alkene-1,2 carboxylic acid with other monomers are satisfactory, such as, for example, copolymers of styrene, vinyl chloride, vinylidene chloride, alpha-methyl-styrene, etc.

Still, in other cases, it may be desirable to use a homopolymer of a picolylamide of an alkene-1,2 carboxylic acid, such as the homopolymer of the acrylic or methacrylic acid, as an additive to an acrylonitrile polymer, or copolymer, and the synthesis is shown in Example XIX.

When it is desired to modify an acrylonitrile copolymer such as the copolymer of acrylonitrile and styrene or the copolymers of acrylonitrile and other copolymerizable ethylenic compounds, it is usually desirable to use as modifiers copolymers containing at least one structural unit present in the acrylonitrile copolymer. Thus as there are present in the acrylonitrile copolymer, structural units derived from the acrylonitrile and styrene, it is desirable to have present in the modifying copolymer structural units derived from styrene and/or acrylonitrile, advantageously both, in addition to those derived from the amide. By thus including in the modifying copolymers structural units of the same type as the structural units of the copolymer to be modified, greater compatibility between the acrylonitrile copolymer to be modified and the modifying copolymer is obtained and the two are more readily soluble in the mutual solvent and will more readily mix into homogeneous polymer mixtures.

Example XVII

Five polymers of acrylonitrile are prepared from the following monomer composition:

| Polymer | Acrylonitrile parts | $CH_2=C-COOH$ <br> $\|$ <br> $CH_2CONHCH_2C_5H_4N$ |
|---|---|---|
| A | 100 | 0.0 |
| B | 99.9 | 0.1 |
| C | 95 | 5.0 |
| D | 90 | 10.0 |
| E | 80 | 20.0 |

The 100 parts of monomer or monomer mixture is, in each case, slowly added over a period of less than an hour to 750–1,000 parts of distilled water at 30–50° C. containing dissolved therein one part of ammonium persulfate, 0.6 to 1.5 parts of sodium bisulfite and 0.5 parts of sodium dodecylbenzene sulfonate. The reaction is continued for 2–6 hours, at which time a yield of about 90 percent solid polymer is precipitated. The resulting polymers have molecular weights over 40,000. Each polymer is dissolved in N,N-dimethyl acetamide or butyrolactone and a film cast from each solution.

A water solution of methylene blue dye (a basic dye) is prepared by making a paste of the dye and then diluting to a one percent by weight dye solution. This dye solution is kept boiling for one hour while the aforementioned films are immersed therein for one hour. The dyed films are then removed and separately subjected to washing with boiling water for one hour, the boiling water being changed frequently to remove the desorbed dye. The unmodified polyacrylonitrile film when treated in this manner shows only a light tint, where as the itaconic half-amide copolymers are dyed a deep and dense shade. Identical films, cold-drawn and heat-treated, show dyeing characteristics similar to the undrawn films.

Fibers are spun from the same N,N-dimethyl acetamide, dimethyl sulfoxide, or butyrolactone solutions either by dry spinning or by wet spinning, into glycerine baths. The fibers are substantially freed from solvent and dried. After cold-drawing the dried fibers 600–900 percent at 120–145° C. and subsequently heat-treating them at 150° C. for one hour, the fibers are given the same dyeing and washing treatment described above with the same results as for the films, a light tint being acquired by the unmodified polyacrylonitrile fibers, and a deep and dense color being given to the itaconate copolymer fibers.

Instead of the itaconic half-amide, the maleic and fumaric half-amides may be used in this example with similar results.

Example XVIII

Five polymers of acrylonitrile are prepared from the following monomer compositions:

| Polymer | Acrylonitrile parts | CH₂=C—CON(CH₃)₂<br>         \|<br>CH₂CONHCH₂C₅H₄N |
|---|---|---|
| A | 100 | 0.0 |
| B | 99.9 | 0.1 |
| C | 95 | 5.0 |
| D | 90 | 10.0 |
| E | 80 | 20.0 |

To 900 parts of water, adjusted to a pH of about three, in a suitable reactor, is added 0.5 to 1 part sodium dodecyl sulfonate, 1.0 part of ammonium persulfate, 0.5 part of sodium bisulfite, and 100 parts of monomer or monomer mixture. The reactor is then flushed with deoxygenated nitrogen and heated with agitation to 50° C. for 24 hours. Steam is introduced into the reactor to remove unpolymerized monomers from the mixture. A small amount of aluminum sulfate is added to the mixture and the polymer isolated by filtration.

The polymer is then washed with water and with methyl alcohol. A portion of the polymer is dissolved in methyl formamide or butyrolactone and a film cast from the solution. The film is washed entirely free of solvent and stretched at a ratio of about 8:1 in a glycerine bath at 135 to 145° C. The film is then washed in water and dyed in a bath containing for each part of film 0.05 part of 1,5-diamino-4,8-dihydroxy-anthraquinone - 3 - sulfonic acid, 0.03 part sulfuric acid and 50 parts water (50:1 bath-film ratio) at boiling temperature for one hour. The film is then removed and washed with water and scoured for 15 minutes in a 0.4 percent soap solution at 85° C. Whereas the unmodified polyacrylonitrile when treated in this manner has little or no color, all the copolymers are dyed to a deeper blue shade.

Fibers are spun from the same solutions either by dry spinning, or by wet spinning. The fibers are substantially freed from solvent and dried. After cold-drawing the dried fibers 600–900 percent at 120–145° C. and subsequently heat-treating them at 150° C. for one hour, the fibers are given the same dyeing and washing treatment described above with the same results as for the films, a light tint being acquired by the unmodified polyacrylonitrile fibers and a deep and dense color being given to the copolymer fibers. The polymers of this example are also soluble in dimethyl formamide, dimethyl acetamide, dimethyl sulfoxide, butyrolactone, ethylene carbonate, formyl morpholine, etc.

Instead of the itaconyl derivatives of this example, the corresponding amide-esters of maleic and fumaric acid may be used with similar results.

Example XIX

Ten parts of the picolylamide of acrylic acid in 100 parts of toluene containing 0.05 part of azobis-isobutyronitrile are heated with stirring in the absence of oxygen and in the presence of nitrogen for 36 hours at 80° C. Fifty parts of benzene are removed under a reduced pressure of 15 mm., the resulting solution is poured into an excess of methanol and the polymer,

is removed by filtration, is dried and is used instead of Polymer E in Example XVI, and excellently dyed films and fibers are obtained. The itaconyl derivative is similarly polymerized and used as above with similar results.

Example XX 11.36 parts of a preformed copolymer of equal molar portions of styrene and maleic anhydride are dissolved in 100 parts of dioxane and 10.8 parts of 3-picolylamine added to the solution and the mixture refluxed for 30 minutes. The mixture is then added to a large excess of heptane-methanol mixture and the solid polymer isolated by filtration and evaporation. The analysis of the polymer product conforms to the structure,

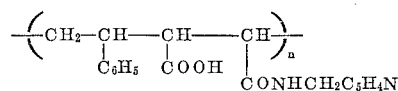

and may be used instead of polymer E of Example XVI to produce polymer compositions dyeable with either acid or basic dyes.

Example XXI

Ten parts of the picolylamide of acrylic acid, 2 parts of divinyl benzene (commercial grade, containing 50% DVB), 0.1 part of benzoyl peroxide are heated at 50° C. for 72 hours, following which the polymer is ground to 10 mesh. Titration with 10% HCl solution shows that the insoluble, infusible copolymer reacts with the theoretical amount of acid. When the copolymer is ground to submicronic size and used, as a pigment, in acrylonitrile polymerization products, dyeable compositions are obtained.

Example XXII

This example illustrates a solution copolymerization suitable for the preparation of fibers directly from such solution.

Eighteen parts of acrylonitrile, 1 part of methyl acrylate, 1 part of the 3-picolylamide of acrylic acid, 0.05 part of potassium of potassium persulfate in 80 parts of dimethyl formamide are heated for 48 hours at 50° C. resulting in a clear non-gelled solution with a conversion of 65% of the acrylonitrile to polymer. The unconverted acrylonitrile is removed at reduced pressure and the resulting solution used directly and spun into fibers with excellent dyeing and physical properties.

The proportion of the amides of this invention in polymerization products may vary from 100% for the alpha-acrylic amides and itaconic amides to 0.1% or less in copolymers with other copolymerizable CH₂=C< compounds, whereas in the case of the beta-substituted acrylic acids they may be varied from equal molar proportions with another copolymerizable CH₂=C< compound to 0.1% or less. When used to achieve or assist in dyeing the higher proportions are not only unnecessary but wasteful even though they can be used over a wide range, from equal molar proportions of ester down to very small amounts in acrylonitrile copolymers. Although even smaller amounts are somewhat effective, the improvement in susceptibility of acrylonitrile copolymers to dyes becomes particularly noticeable when the ester content of the copolymer is about 0.1 percent and increases as the amount of ester is increased. Ordinarily sufficient improvement in dye susceptibility is obtained with amounts of ester ranging up to about 10 to 15 percent but it may be advantageous for reasons such as in the preparation of ion-exchange polymers or additives to improve dyeing properties to have a larger proportion of ester in the acrylonitrile copolymer. In such cases the concentration of ester can range up to or approaching 50 mol percent. Within these proportions acrylonitrile copolymers of the invention show great affinity toward many dyes especially basic, acidic, vat and cellulose dyes, acetate dyes.

In addition to the improvements effected in the resulting copolymers, the use of the amides of this invention has certain other advantages over the use of the acids from which they were derived. For example, these amides are more soluble in acrylonitrile than the acids. Therefore, it is generally easier to get complete copolymerization of the amide with acrylonitrile in solution, emulsion and suspension polymerizations.

The acrylonitrile copolymers discussed herein are soluble in N,N-dimethyl acetamide (DMA), N,N-dimethyl formamide (DMF), butyrolactone (BL), ethylene carbonate (EC), dimethyl sulfoxide (DMS), N-methyl-2-pyrrolidone (MP), and a number of similar solvents, used alone or in conjunction with N,N-dimethyl cyanamide, N,N-dimethyl cyanoacetamide, N,N-dimethyl methoxy-acetamide, methylene dinitrile, methylene di-thiocyanate, formyl caprolactam, formyl morpholine, tetramethylene sulfone, etc. Nitroalkanes, such as nitromethane, may be used as solvents for such copolymers having no more than about 85 percent acrylonitrile, providing the comonomers used in preparing such copolymers do not have substituent groups of equal or greater secondary-bonding force than the cyano groups of acrylonitrile. Copolymers of the present invention which have high proportions of monomers of relatively low secondary-valence bonding strength such as vinyl chloride, may often be dissolved in acetone or mixtures of acetone and solvents of the above types.

The polymerization products of this invention have in the polymer molecule a plurality of repeating units of the formulas

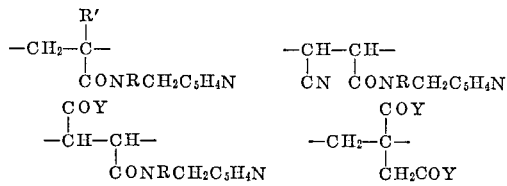

wherein the various symbols are as indicated above. When the monomers of this invention are copolymerized with a copolymerizable comonomer the resultant copolymer will also contain repeating units derived from that comonomer; and when the comonomer is acrylonitrile the copolymer will also contain repeating units of the formula,

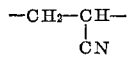

For example, polymers of the acrylate of Example I of the maleate half amide of Example III and the intaconic half amide of Example III have the following repeating unit formulas respectively

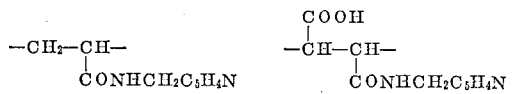

and

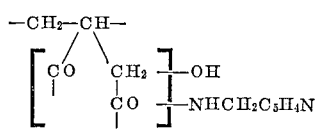

In addition, the copolymers can contain any number of repeating units of the type obtained by the copolymerization of the amides of the invention or a mixture of acrylonitrile and the amide with one or more copolymerizable ethylenic compounds, such as, for example, vinylidene chloride, vinyl chloride, styrene, alpha-methylstyrene and methacrylonitrile. When the polymerization mass contains, in addition to the picolylamide, a polymerizable monomer having a $CH_2=C<$ group in an amount such that the latter monomer is present to an extent of at least 50 mols percent of the overall monomer content, then monomers such as fumaronitrile, beta-cyano-acrylamide and methyl beta-cyano-acrylate can also be present in the polymerization mixture.

As previously indicated, the solvent resistance of such copolymers as contain one or more monomer units in addition to those formed by the acrylonitrile and the amides of the invention is affected by the type and proportion of copolymerizing monomer or monomers used to replace part of the acrylonitrile. For example, copolymers containing small amounts of the amide units can contain various proportions of such monomer units as obtained from vinylidene chloride, methacrylonitrile, fumaronitrile, and beta-cyanoacrylamide without considerable reduction in solvent resistance. Replacement of acrylonitrile units in the copolymers by vinyl chloride, styrene and alpha-methylstyrene units result in copolymers of lowered solvent resistance, the amount of such lowering in resistance in each case depending on the amount substituted. In addition to the solvent resistance, certain other physical properties of the copolymers are affected by the presence of these additional units in the copolymers. The amount and character of the changes in physical properties of these copolymers depend again on the type and proportion of copolymerizing monomer or monomers used. For example, the tensile strength of an acrylonitrile-amide type copolymer will decrease much more when a monomer having relatively weak secondary bonding forces, such as styrenes or ethylene is used to replace part of the acrylonitrile than when one or more monomers having relatively strong bonding forces, such as methacrylonitrile, fumaronitrile, beta-cyano-acrylamide, methyl beta-cyano-acrylate and vinylidene chloride, is used to replace part of the acrylonitrile. Moreover, the ability of these copolymers to form molecularly oriented shaped articles depends on the type and amount of the copolymerizing monomer or monomers used to replace acrylonitrile.

Other copolymerizable ethylenic compounds, which can also be present in the polymerizable masses for copolymerization with the amides used in this practice of this invention include one or more of the following acrylates, e.g., methyl acrylate; methacrylate, e.g., methyl methacrylate; acrylamides; methacrylamides; vinyl esters, such as vinyl acetate; itaconic diesters, such as dimethyl and diethyl itaconates; itaconamide; vinyl halides, such as vinyl fluoride, vinylidene flouride, tetrafluoroethylene, trifluorochloroethylene; vinyl aryls, such as vinyl naphthalenes and the nuclear-substitutes styrenes listed in Example XIII, etc.

The polymerization products of this invention can be prepared by various polymerization systems, such as emulsion, suspension, mass and solution polymerizations at temperatures from about 5 to 100° C. preferably between 30 and 50° C. In addition to the monomers, the polymerizable mass can also contain other materials such as catalysts, e.g., peroxides, such as benzoyl peroxide, naphthyl peroxides, phthalyl peroxide, tertiary-butyl hydro-peroxide, hydrogen peroxide, cyclohexyl hydroperoxide, tertiarybutyl perbenzoate, etc., azo catalysts, persulfates, such as ammonium persulfate, potassium persulfate, potassium perphosphate, persulfuric acid., etc., solvents, suspension or emulsion media, emulsifying agents, suspension agents, plasticizers, lubricants, etc.

For use in the preparation of shaped articles, the polymerization products of this invention have molecular weights preferably of at least about 10,000. For fibers, the molecular weights desired are preferably at least about 40,000. However, polymerization products of molecular weights less than 10,000 may be used for other purposes, such as impregnants, solvent resistant coatings, etc. The molecular weight of the polymerization products is dependent on the concentration of the monomers, the temperature of the reaction, whether the polymer product is prepared in solution or in emulsion or in the presence or absence of chain-transfer agents, etc.

Useful fibers can be made from the solutions of the copolymers of this invention by dry spinning, as in the preparation of cellulose acetate fibers, or by wet spinning, as in the preparation of viscose rayon. In wet spinning, the solution of copolymer can be spun into a substance which is a nonsolvent for the copolymer, but which is advantageously compatible with the solvent in which the copolymer is dissolved. For example, water, acetone, methyl alcohol, carbon disulfide, glycerine, chloroform, carbon tetrachloride, benzene, etc., may be used as a precipitating bath for N,N-dimethyl acetamide, dimethyl sulfoxide, butyrolactone, ethylene carbonate and other solvent compositions of these copolymers. The extruded fibers, from which substantially all of the solvent has been removed in the spinning step, about 1–10 percent remaining in the shaped article, may then be cold-drawn about 100–900 percent, preferably about 300–600 percent; and the drawn fiber heat-treated, usually at substantially constant length, at about 100–160° C. to effect further crystallization and removal of the remaining solvent. The term "heat-treated," as used herein, refers to the application of heat to an object, usually at a controlled temperature and usually by means of the medium surrounding the object.

Many of the acrylonitrile copolymers of this invention can be molecularly oriented, especially if there is no more than 15 percent of amide in the copolymer molecules. This is true when the major portion of the copolymer is acrylinitrile, for example, 85 percent or more acrylonitrile, or when the other copolymerizing monomers used in making such copolymers have substituent groups having secondary-valence bonding forces equal to or greater than exhibited by the cyano group in acrylonitrile. For example, if such monomers as methacrylonitrile, fumaronitrile, vinylidene chloride, beta-cyano-acrylamide and methyl beta-cyano-acrylate are used with acrylonitrile and an amide according to the invention, the proportion of acrylonitrile in the copolymers may be much less than 85 percent without destroying the capacity for molecular orientation. Molecularly oriented, cold-drawn, shaped articles of particular usefulness are prepared from copolymer compositions containing in the polymer molecules 60–99.9 percent acrylonitrile, 0.1–15 percent, advantageously 0.1–5 percent, the amide, with or without one or more monomers of the class consisting of vinylidene chloride, vinyl chloride, styrene, alpha-methyl-styrene, methacrylonitrile, fumaronitrile, beta-cyano-acrylamide and methyl beta-cyano-acrylate, the effects of the presence of monomers of this class being noticeable when the monomer is present in the polymer molecule in amounts of one percent or more.

The polymerization products of this invention show great affinity for the acetate, acidic and vat dyes. The cellulose acetate dyes which are effective with these polymerization products are mainly amino anthraquinone derivatives. A number of other acidic dyes that can be used are anthranilic acid→1-(4′-sulfophenyl)-3-methyl-5-pyrazalone; 1,5-diamino-4,8-dihydroxy-anthraquinone-3-sulfonic acid; 1-amino-naphthalene-4-sulfinic acid→α-naphthol-4-sulfonic acid; the sodium salt of sulfanilic acid → aniline→2 - benzoyl - amino-5-naphthol-7-sulfonic acid; the sodium salt of 4,4′-diamino-stilbene-2,2′-disulfonic acid $\overset{\rightarrow}{\rightarrow}$(phenol)$_2$ ethylated; 1,5-diamino-4,8-dihydroxyanthraquinone-3-sulfonic acid; dye prepared by diazotizing 1-amino-naphthalene-4-sulfonic acid and coupled with alpha-naphthol-4-sulfonic acid; the sodium salt of (m-amino-benzoic acid→o-anisidine) phosgenated; the sodium salt of (2-naphthol-6,8-disulfonic acid←benzidine →phenol) ethylated; dimethoxy-di-benzanthrone; and 1,5-di-p-anisoylamino-4,8-dihydroxy-anthraquinone.

From the molecularly orientable copolymers of this invention fibers can be prepared having improved dyeing properties, low shrinkage in boiling water, sometimes as low as 3 to 5 percent or less of the cold-drawn or stretched article, good heat-resistance, and tensile strength in the order of 4 to 6 grams per denier. Moreover, these properties make the fibers desirable in the manufacture of hosiery and for such all-purpose fabrics as used for blouses, shorts, suits, etc.

The invention claimed is:

1. A compound having a formula selected from the class consisting of:

$$CH_2=\underset{\underset{R'}{|}}{C}-CONRCH_2C_5H_4N$$

$$\underset{\underset{CN}{|}}{CH}=CH-CONRCH_2C_5H_4N$$

$$\underset{\underset{COY}{|}}{CH}=CH-CONRCH_2C_5H_4N$$

and $$CH_2=\underset{\underset{CH_2-COY}{|}}{C}-COY$$

wherein R′ is a radical selected from the class consisting of hydrogen, methyl, chloro, or cyano radicals; $CH_2C_5H_4N$ represents a monovalent picolyl radical, Y is a radical selected from the class consisting of —NRCH$_2$C$_5$H$_4$N, —OR, —NR$_2$, piperidinyl, piperazinyl and morpholino radicals, in said formula having two Y groups therein, at least one of said Y groups representing —NRCH$_2$C$_5$H$_4$N; R is a radical selected from the class consisting of hydrogen, hydrocarbon radicals and derivatives of hydrocarbon radicals in which each deriviative group is selected from the class consisting of halo, alkoxy, aryloxy and cycloalkoxy groups, said hydrocarbon groups and hydrocarbon derivative groups each having no more than 20 carbon atoms therein.

2. A compound having the formula
$$CH_2=CH-CONHCH_2C_5H_4N$$
the $CH_2C_5H_4N$ of said formula representing a monovalent picolyl radical.

3. A compound having the formula $$CH_2=\underset{\underset{CH_3}{|}}{C}-CONHCH_2C_5H_4N$$

the $CH_2C_5H_4N$ of said formula representing a monovalent picolyl radical.

4. A compound having the formula $$CH_2=\underset{\underset{Cl}{|}}{C}-CONHCH_2C_5H_4N$$

the $CH_2C_5H_4N$ of said formula representing a monovalent picolyl radical.

5. A compound having the formula $$\underset{\underset{CN}{|}}{CH}=CH-CONHCH_2C_5H_4N$$

the $CH_2C_5H_4N$ of said formula representing a monovalent picolyl radical.

6. A compound having the formula $$\underset{\underset{COOH}{|}}{CH}=CH-CONHCH_2C_5H_4N$$

the $CH_2C_5H_4N$ of said formula representing a monovalent picolyl radical.

7. A compound having the formula $$\left[ \begin{array}{l} CH_2=C-C(O)- \\ \phantom{CH_2=}|\phantom{C-C(O)-} \\ \phantom{CH_2=}CH_2-C(O)- \end{array} \right] \begin{array}{l} -OH \\ \\ -NHCH_2C_5H_4N \end{array}$$

the $CH_2C_5H_4N$ of said formula representing a monovalent picolyl radical.

8. A compound having the formula $$\underset{CH-CONHCH_2C_5H_4N}{\overset{CH-CONHCH_2C_5H_4N}{\|}}$$

the $CH_2C_5H_4N$ of said formula representing a monovalent picolyl radical.

9. A compound having the formula $$CH_2=\underset{\underset{CH_2-CONHCH_2C_5H_4N}{|}}{C}-CONHCH_2C_5H_4N$$

the $CH_2C_5H_4N$ of said formula representing a monovalent picolyl radical.

10. A compound having the formula
$$(CH_3)_2NOCCH=CHCONHCH_2C_5H_4N$$
the $CH_2C_5H_4N$ of said formula representing a monovalent picolyl radical.

11. A polymer having a plurality of repeating units in in the linear chain of the polymer molecules thereof having a formula selected from the class consisting of $$-CH_2-\underset{\underset{CONHCH_2C_5H_4N}{|}}{\overset{\overset{R'}{|}}{C}}-$$

$$-\underset{\underset{CN}{|}}{CH}-\underset{\underset{CONHCH_2C_5H_4N}{|}}{CH}-$$

$$-\underset{\underset{CONHCH_2C_5H_4N}{|}}{\overset{\overset{COY}{|}}{CH}}-CH-$$

$$-CH_2-\underset{\underset{CH_2COY}{|}}{\overset{\overset{COY}{|}}{C}}-$$

wherein R' is a radical selected from the class consisting of hydrogen, methyl, chloro, or cyano radicals; Y is a radical selected from the class consisting of
$$-NRCH_2C_5H_4N, -OR, -NR_2$$
piperidinyl, piperazinyl and morpholino radicals, in said formula having two Y groups therein, at least one of said Y groups representing $-NRCH_2C_5H_4N$; R is a radical selected from the class consisting of hydrogen, hydrocarbon radicals and derivatives of hydrocarbon radicals in which each derivative group is selected from the class consisting of halo, alkoxy, aryloxy and cycloalkoxy groups, said hydrocarbon groups and hydrocarbon deriviative groups each having no more than 20 carbon atoms therein the $CH_2C_5H_4N$ of said formula representing a monovalent picolyl radical.

12. A polymer of claim 11 in which said polymer molecules also contain a plurality of repeating units of the formula $$-\underset{\underset{CN}{|}}{CH_2-CH}-$$

13. A synthetic fiber having molecular orientation, said fiber comprising a copolymer of about 80–99.9% by weight of repeating units of the formula $$-\underset{\underset{CN}{|}}{CH_2-CH}-$$

and 0.1 to 20% by weight of repeating units of at least one formula selected from the class consisting of $$-CH_2-\underset{\underset{CONHCH_2C_5H_4N}{|}}{\overset{\overset{R'}{|}}{C}}-$$

$$-\underset{\underset{CN}{|}}{CH}-\underset{\underset{CONHCH_2C_5H_4N}{|}}{CH}-$$

$$-\underset{\underset{CONHCH_2C_5H_4N}{|}}{\overset{\overset{COY}{|}}{CH}}-CH-$$

$$-CH_2-\underset{\underset{CH_2COY}{|}}{\overset{\overset{COY}{|}}{C}}-$$

wherein R' is a radical selected from the class consisting of hydrogen, methyl, chloro, or cyano radicals; Y is a radical selected from the class consisting of
$$-NRCH_2C_5H_4N, -OR, -NR_2$$
piperidinyl, piperazinyl and morpholine radicals, in said formula having two Y groups therein, at least one of said Y groups representing $-NRCH_2C_5H_4N$; R is a radical selected from the class consisting of hydrogen, hydrocarbon radicals and derivatives of hydrocarbon radicals in which each derivative group is selected from the class consisting of halo, alkoxy, aryloxy and cycloalkoxy groups, and hydrocarbon groups and hydrocarbon derivative groups each having no more than 20 carbon atoms therein the $CH_2C_5H_4N$ of said formula representing a monovalent picolyl radical.

14. A synthetic fiber having molecular orientation and comprising a copolymer of 60–98.9% by weight of acrylonitrile, about 1 to 39% by weight of a compound selected from the class consisting of styrene, alpha-methyl styrene, methyl acrylate, methyl methacrylate, vinyl chloride, vinylidene chloride, vinylidene cyanide, methyl-alpha-cyano-acrylate and methyl-beta-cyano-acrylate, and about 0.1 to 10% by weight of a compound of claim 1.

15. A synthetic fiber of claim 14 in which said copolymer has a molecular weight of at least 40,000.

16. A synthetic fiber of claim 13 in which said copolymer has a molecular weight of at least 40,000.

17. A copolymer containing at least 80% by weight of repeating units of the formula, $$-\underset{\underset{CN}{|}}{CH_2CH}-$$

and at least 0.1% by weight of repeating units of claim 11.

18. A copolymer containing at least 80% by weight of repeating units of the formula, $$-\underset{\underset{CN}{|}}{CH_2CH}-$$

and at least 0.1% by weight of repeating units of the formula $$-\underset{\underset{CONHCH_2C_5H_4N}{|}}{CH_2-CH}-$$

the $CH_2C_5H_4N$ of said formula representing a monovalent picolyl radical.

19. A copolymer containing at least 80% by weight of repeating units of the formula, $$-\underset{\underset{CN}{|}}{CH_2CH}-$$

and at least 0.1% by weight of repeating units of the formula $$-\underset{\underset{CONHCH_2C_5H_4N}{|}}{\overset{\overset{COOH}{|}}{CH}}-CH-$$

the $CH_2C_5H_4N$ of said formula representing a monovalent picolyl radical.

20. A copolymer containing at least 80% by weight of repeating units of the formula, $$-\underset{\underset{CN}{|}}{CH_2CH}-$$

and at least 0.1% by weight of repeating units of the formula $$\left[-CH_2C\underset{\underset{CO-NHCH_2C_5H_4N}{}}{\overset{\overset{CO-OH}{}}{<}}CH_2\right]$$

the $CH_2C_5H_4N$ of said formula representing a monovalent picolyl radical.

References Cited by the Examiner

UNITED STATES PATENTS

| | | | |
|---|---|---|---|
| 2,313,392 | 3/1943 | Miller | 260—78 |
| 2,687,400 | 8/1954 | D'Alelio | 260—78 |
| 2,687,401 | 8/1954 | D'Alelio | 260—78 |
| 2,749,331 | 6/1956 | Breslow | 260—78 |
| 2,751,391 | 6/1956 | Bersworth | 260—295 |
| 3,072,649 | 1/1963 | Semb et al. | 260—295 |

WILLIAM H. SHORT, *Primary Examiner.*

HAROLD N. BURSTEIN, *Examiner.*

H. D. ANDERSON, *Assistant Examiner.*